United States Patent Office 3,666,492

Patented May 30, 1972

3,666,492
CHEWING GUM

James Teng, St. Louis, Mo., and Chokyun Rha, Worcester County, Mass., assignors to Anheuser-Busch, Inc., St. Louis, Mo.

No Drawing. Filed Apr. 6, 1970, Ser. No. 26,108
Int. Cl. A23g *3/30*
U.S. Cl. 99—135 4 Claims

ABSTRACT OF THE DISCLOSURE

Chewing gum made from a fatty acid ester of starch, preferably starch laurate, as the chewing gum base. The starch laurate has a degree of substitution of above about 2.

BACKGROUND OF THE INVENTION

Chewing gum consists of two major portions, masticatory and non-masticatory. The masticatory portion is usually called chewing gum base, often including filler, and the non-masticatory portion consists mostly of sweetening and flavoring ingredients.

For a long time, natural water-insoluble gums of vegetable origin, i.e. chicle, were used for the major portion of chewing gum base. Unfortunately, the natural gums are subject to substantial price fluctuations as well as unpredictability of supply. Because of these reasons, manufacturers have in recent years tried with varying degrees of success to duplicate the desirable properties of natural gum by means of synthetic resins, rubber and other polymers.

U.S. Pat. No. 3,396,038 and patents referred to therein give representative showings of the art with respect to synthetic resin bases, particularly those of polyvinyl acetate derivation. The art also has known gum bases which have included gluten (Pat. Nos. 2,586,675 and 1,700,387), prolamine (Pat. No. 2,469,861), and Zein (Pat. No. 2,489,147).

Accordingly, one of the principal objects of the present invention is to provide a chewing gum made from a fatty acid ester of starch which meets the industry criteria for functional and esthetic qualities.

A further object is to provide a synthetic chewing gum base made from starch laurate of greater than about 2 degrees of substitution.

A further object is to provide a chewing gum which is smoother, more cohesive, free from tackiness and resilient after mastication. Still a further object is to provide a chewing gum base which is of wholesome appearance and can be simply and economically formulated and processed into chewing gum.

These and other objects and advantages will become apparent hereinafter.

SUMMARY OF THE INVENTION

This invention comprises a superior chewing gum in which the gum base is made from starch derivatives, more specifically, fatty acid derivatives of starch such as starch laurate. This invention also relates to a process for preparing such gum and base as hereinafter described and claimed.

DETAILED DESCRIPTION

Starch laurate is prepared by reacting lauroyl chloride with starch suspended in dioxane. The substitution reaction is catalyzed by pyridine. Generally about 50% excess of the theoretical amount of lauroyl chloride is used. The reaction is facilitated by heating at higher temperature. Generally, the reaction is maintained at a temperature range of 95 to 100° C. and a reaction time of 6–8 hours.

After the reaction, laurate gum is precipitated from the reaction mixture by the addition of methanol. The gum is then purified by dissolving in chloroform, followed by repeated water washes and the precipitation of the gum from chloroform by methanol addition. The gum thus collected is then dried at 80° C. under reduced pressure. If necessary, the purification by dissolving in chloroform may be repeated until the gum is free of odor.

In order to be acceptable as chewing gum base, the starch laurate must have a degree of substitution higher than 2 (theoretical maximum-3). Starch laurate with D.S. lower than 2 usually does not possess the gummy plasticity. As the D.S. value decreases, the laurate becomes increasingly less hydrophobic and more water soluble. The starch laurate suitable for making chewing gum has high oil solubility and the starch laurate does not separate out from oil solution upon cooling.

Starch esters of other saturated fatty acids having a chain length of $C_8$–$C_{14}$, also produce gum suitable for chewing gum. Starch esters having a chain length less than eight carbons are generally amorphous solids. Gummy properties are exhibited by those with a chain length of 8–14 carbons. Above the chain length of 14 the esters tend to be brittle. Unsaturated esters often appear as greasy pastes.

The starch laurate of high lauroyl content prepared as herein described has good gummy, cohesive masticatory properties. When this starch derivative is formulated into a chewing gum base, the resultant product is similar to or superior to both natural and synthetic chewing gum based products as shown by the results of the chew test performed in accordance with the method generally accepted in the trade.

300 to 600 parts of lauroyl chloride is reacted with 100 parts of corn starch suspended in 50 to 2000 parts dioxane. 100 to 300 parts pyridine is used to catalyze the reaction. The reactants are maintained at 80 to 110° C. for 10 to 5 hours. About 350 to 400 parts starch laurate precipitates from the mixture and is removed therefrom. The starch laurate is dissolved in 500 to 2000 parts chloroform, washed with water, and the starch laurate gum is precipitated from the chloroform by the addition of 1000 to 4000 ml. methanol. The starch gum precipitate is dried at 50 to 80° C. for about 3 to 6 hours. 10 parts of starch laurate prepared as above is mixed with 0 to 5 parts of dipentylphthalate, 0 to 1 parts of polyglycerololeate, 0 to 1 parts of glycerol, 0 to 0.5 part of propyleneglycol, and 0 to 0.5 part of oleic acid until uniform. Chewing gum was prepared by mixing about 10 to about 99% of the above prepared chewing gum base, 0 to 40% filler, 0.3 to 30% flavoring agent, and sufficient sweetening agent to suit the taste. Preferably, 20 to 95% of the composition is chewing gum base.

Suitable fillers include infusorial earth and corn starch. Suitable flavoring agents include natural and synthetic flavor concentrates. Suitable sweeteners include sugar, syrups and/or artifiicial sweeteners.

The melting point of the starch laurate is 60° C. to 120° C.

Following is a preferred example of this invention.

Example No. 1

405 gms. of lauroyl chloride is reacted with 72 gms. of corn starch suspended in 925 ml. dioxane. 220 gms. pyridine is used to catalyze the reaction. The reactants are maintained at 100° C. for 6 hours. 2000 ml. methanol is added to the mixture at 50° C. 475 gms. starch laurate precipitates from the mixture and is removed therefrom. The starch laurate is dissolved in 700 ml. chloroform, washed with water, and the starch laurate gum is precipitated from the chloroform by the addition of 2000 ml.

methanol. The starch gum precipitate is dried at 80° C. for 5 hours. The starch laurate has a degree of substitution of 2.9 and a melting point of 85° C.

Example No. 1A 5 gms. of the foregoing starch laurate was mixed with 0.8 ml. dipentylphthalate, 0.3 ml. polyglycerololeate, and 0.3 ml. of glycerol. The mixture was placed in an 80° C. oven and mixed until uniform. This chewing gum base heated to 80° C. was mixed with 40 gm. of corn syrup at 80° C. When they were mixed thoroughly, 4.0 gm. of powdered sugar was added in small portions and mixed. When the mixture became uniform, flavoring agent was added. The flavoring agent was Perma-Stabil Orange Flavor No. 6033.

Example No. 2

10 gms. of the foregoing starch derivative is mixed with 1.8 gm. of glycerol, 0.2 gm. of propylene glycol, and 3.0 gm. of infusorial earth. 0.5 gm. polyethylene glycol also is added to the mixture. The mixture is heated in a 100° C. oven and mixed further to form a gum base. Into the gum base 33 gm. of powdered sugar, 15.8 gm. of corn syrup, and 1.32 gm. of starch are added. The mixture is heated in an oven (100° C.) until melted and mixed again. The mixture is kneaded, shaped and roled into slabs of chewing gum.

The following Table No. 1 compiles the results when the foregoing gum is tested by the chewing criteria described in the attached "Numerical Evaluation." The numeral 10 is optimum and both above and below 10 are less than optimum. Brands A–C are commercially purchased chewing gums.

TABLE NO. 1.—CHEWING TEST

| Sample | Brand A | Brand B | Brand C | Starch laurate chewing gum |
|---|---|---|---|---|
| | Initial stage | | | |
| Flexibility | 10 | 10 | 10 | 10 |
| Stiffness | 10 | 11 | 11 | 10 |
| Adhesion | 10 | 10 | 9 | 10 |
| | Intermediate stage | | | |
| Firmness of low point | 9 | 8 | 7 | 10 |
| Duration (mins.) | 3 | 4 | 4 | 4 |
| | Final stage (base only) | | | |
| Smoothness | 9 | 10 | 7 | 10 |
| Stiffness | 8 | 9 | 10 | 10 |
| Lift | 9 | 8 | 10 | 10 |
| Freeness | 11 | 10 | 10 | 10 |
| Cohesion | 13 | 11 | 10 | 10 |
| Stretch | 11 | 8 | 8 | 12 |
| Taste | 10 | 10 | 10 | 10 |

NUMERICAL EVALUATION

| | | 0 | 10 | 20 |
|---|---|---|---|---|
| Initial | Flexibility | Brittle | Good | Floppy. |
| | Stiffness | Raglike | Medium | Leathery. |
| | Adhesion | Crumbly | Gummy | Tacky. |
| Intermediate | Firmness of low point. | Sloppy | Firm as final | |
| Final | Smoothness | Rough | Silky | Too slippery. |
| | Stiffness | Soupy | Medium | Leathery. |
| | Lift | Plastic | Round | Rubbery. |
| | Freeness | Tacky | Free | |
| | Cohesion | Waxy | Slight wet paper | Too wet papery. |
| | Stretch | Stringy | Full and wide | None (tears). |
| | Taste | Objectionable | None | |

The term "medium" as used above defines a chew which is between softness and firmness.

TERMINOLOGY

Initial stage:

Consists of the first few bites before the gum is hydrated or warmed.

Flexibility describes the condition of the piece even before chewing and is self-explanatory.

Stiffness is the opposition offered to the teeth when bitten.

Adhesion when too high becomes tacky due to glucose rather than base and its low extreme is crumbly.

Intermediate stage:

Is a temporary softness due to hydration before all sugar is removed. This stage disappears as sugar is removed and the cud approaches straight base.

Firmness at low point is the consistency of the base at maximum softness as compared to its consistency at the final stage of the chew.

Duration is self-explanatory.

Final stage:

Is attained when sugar and glucose are removed.

Smoothness describes the feel of the cud (when flattened against the roof of the mouth) to the tongue. Slippery or slimy is excessive smoothness. A satiny or silky feeling is desirable.

Stiffness is the opposition of the cud to the teeth at the *start* of the bite.

Lift is the capacity to obliterate or round out indentations in a cud caused by the tooth. It may be described as resilience or spring-back. The absence of lift is plasticity or waxiness.

Freeness is the absence of adhesion to the teeth.

Cohesion is the opposition offered to the teeth at the end of the bite as compared to the start. (The increment of increase in stiffness from the start of the bite to the end.) It is desirable to have the increase in stiffness graduate throughout the bite rather than a sharp increase at the end of the bite.

Stretch is that property which enables a sample to be pulled out in a ribbon to arm's length.

Taste—A measure of the desirable lack of this quality in the base.

The chewing gum made from this starch derivative has superior characteristics compared with many of the commercial chewing gums in the sense that it is smoother, more cohesive, completely free from tackiness and resilient upon mastication. It is also less tacky or adhesive when discarded after chewing. The appearance of the starch laurate chewing gum is more attractive because of its pearly white color and sheen than is ordinary chewing gum, which has a dull greyish color or is tinted.

Because of the thermoplastic properties of starch laurate, the extremely high kneading-mixing action, high energy input, and long mixing time normally required in production of chewing gum can be reduced considerably when starch laurate is used.

Generally, commercial chewing gum base is comprised of a complex blend of several ingredients. Sometimes mixtues of more than one ingredient from the following categories are used.

(A) Water-insoluble, natural, chewable, plastic gum as chicle or substitutes including jelutong, guttakay, rubber, etc.

(B) Synthetic water-insoluble chewable, plastic polymers such as butadiene-styrene rubber, isobutylene-isoprene copolymer, polyisobutylene, polyvinyl acetate, etc.

(C) Plasticizers or softening agents such as glycerine, dibutyl phthalate, butyl phthalyl butyl glycolate, methylacetyl ricinoleate, acetyl tributyl citrate, propylene glycol, hydrogenated oil, lecithin, waxes and the like.

(D) Cohering or adhering agents such as natural or synthetic terpene resins.

(E) Filling agents such as infusorial earth or calcium carbonate.

(F) Preservatives or other miscellaneous additives such as antioxidants or reaction controlling agents and the like.

In contrast to this, starch laurate is capable of being compounded into a good chewing gum base with the addition of only one or two ingredients.

Following are additional examples of this invention.

Example No. 3

When 5 gms. of starch laurate of degree of substitution of 2.9, and melting point of 85° C. is heated to 80° C. and mixed with 0.5 ml. of polyglycerol oleate, the resulting chewing gum base is equal to or better in quality than commercially available chewing gum base. The chewing gum base mixed with 10 gms. of powdered sugar and 0.5 gm. of starch and a flavoring agent produces chewing gum which is equal to or better in quality than commercial chewing gums.

Example No. 4

5 gms. of starch laurate of D.S. of 2.9, and melting point of 85° C. is heated to 80° C., and mxied with 0.5 ml. of polyglycerol oleate and 0.2 ml. of dipentyl phthalate. The resulting chewing gum base is equal to or better in quality than commercially avaliable chewing gum base. The chewing gum made with this chewing gum base using the same amount of other ingredients as in Example No. 3 also is equal to or superior to commercial chewing gum.

This invention is intended to cover all changes and modifications of the examples of the invention herein chosen for purposes of the disclosure which do not constitute departures from the spirit and scope of the invention.

What is claimed is:

1. A chewing gum comprising as an essential ingredient a chewing gum base of a fatty acid ester of starch having a degree of substitution of at least about 2, said fatty acid being saturated and having from 8–14 carbon atoms.

2. The product of claim 1 wherein the starch ester is starch laurate.

3. The product of claim 2 wherein the starch laurate has a melting point of 85° C.

4. The chewing gum of claim 1 wherein the base comprises 10 to 99% of the product and including 0 to 30% filter and 0.05 to 50% sweetening agent.

References Cited

UNITED STATES PATENTS

| | | | |
|---|---|---|---|
| 1,651,366 | 12/1967 | Berthon | 260—233.5 |
| 2,868,780 | 1/1959 | Minkema | 260—233.5 |
| 3,396,038 | 8/1968 | Knapp | 99—135 |

RAYMOND N. JONES, Primary Examiner

J. M. HUNTER, Assistant Examiner